United States Patent
Jain et al.

(10) Patent No.: US 9,467,365 B2
(45) Date of Patent: Oct. 11, 2016

(54) MECHANISM AND FRAMEWORK FOR FINDING OPTIMAL MULTICAST TREE ROOTS WITHOUT THE KNOWLEDGE OF TRAFFIC SOURCES AND RECEIVERS FOR FABRICPATH AND TRILL

(71) Applicant: Cisco Technology, Inc., San Jose, CA (US)

(72) Inventors: Sourabh Jain, Sunnyvale, CA (US); Varun Shah, Milpitas, CA (US); Ayan Banerjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 688 days.

(21) Appl. No.: 13/767,438

(22) Filed: Feb. 14, 2013

(65) Prior Publication Data
US 2014/0226491 A1 Aug. 14, 2014

(51) Int. Cl.
| | |
|---|---|
| H04L 12/733 | (2013.01) |
| H04L 12/761 | (2013.01) |
| H04W 40/02 | (2009.01) |
| H04L 12/721 | (2013.01) |
| H04L 12/753 | (2013.01) |

(52) U.S. Cl.
CPC ............. H04L 45/122 (2013.01); H04L 45/16 (2013.01); *H04L 45/12* (2013.01); *H04L 45/48* (2013.01); *H04W 40/02* (2013.01)

(58) Field of Classification Search
CPC ....... H04L 45/48; H04L 45/00; H04L 45/12; H04L 45/02; H04L 41/12; H04W 40/02
See application file for complete search history.

(56) References Cited

U.S. PATENT DOCUMENTS

| | | | | |
|---|---|---|---|---|
| 7,280,481 | B2 * | 10/2007 | Rong | 370/238 |
| 9,014,202 | B2 | 4/2015 | Jain et al. | |
| 2005/0114551 | A1 * | 5/2005 | Basu et al. | 709/249 |
| 2010/0322244 | A1 * | 12/2010 | Dasylva et al. | 370/390 |
| 2012/0278261 | A1 * | 11/2012 | Lin et al. | 706/12 |
| 2012/0278599 | A1 | 11/2012 | Nilakantan et al. | |
| 2013/0003739 | A1 | 1/2013 | Raman et al. | |
| 2013/0223454 | A1 | 8/2013 | Dunbar et al. | |
| 2014/0226480 | A1 | 8/2014 | Jain et al. | |
| 2015/0229566 | A1 | 8/2015 | Jain et al. | |

OTHER PUBLICATIONS rfc2328_OSPF_V.2, Apr. 1998.*
U.S. Official Action dated Sep. 24, 2014 in U.S. Appl. No. 13/767,451, 17 pgs.
U.S. Appl. No. 13/767,451, filed Feb. 14, 2013 entitled "Least Disruptive AF Assignments in TRILL LAN Adjacencies," Inventors: Jain et al.
U.S. Appl. No. 14/691,542, filed Apr. 20, 2015 entitled "Least Disruptive AF Assignments in TRILL LAN Adjacencies," Inventors: Jain et al.
U.S. Official Action dated Dec. 17, 2015 in U.S. Appl. No. 14/691,542, 29 pgs.
U.S. Final Office Action dated Jul. 12, 2016 cited in U.S. Appl. No. 14/691,542, 22 pgs.

* cited by examiner

*Primary Examiner* — Un C Cho
*Assistant Examiner* — Oussama Roudani
(74) *Attorney, Agent, or Firm* — Merchant & Gould P.C.

(57) ABSTRACT

The proposed methodology enables finding the most efficient roots in the network to carry multicast traffic, while further providing a theoretical basis for such selection. It guarantees the minimum expected delivery cost for multicast frames in the absence of any knowledge about the source and receivers.

18 Claims, 4 Drawing Sheets

200

A priority value for each of a plurality of nodes is calculated as equal to a maximum priority value less a normalized distance value
210

An optimal candidate node may be selected as the root for one or more multicast trees
220

Determine whether two or more nodes have the same priority value
230

Priority value for the optimal candidate node advertised to all other nodes
240

MECHANISM AND FRAMEWORK FOR FINDING OPTIMAL MULTICAST TREE ROOTS WITHOUT THE KNOWLEDGE OF TRAFFIC SOURCES AND RECEIVERS FOR FABRICPATH AND TRILL

BACKGROUND

Layer-2 link-state protocols such as Fabricpath and TRansparent Interconnection of Lots of Links (TRILL) networks (TRILL)—are currently being deployed as the networking fabric to enable large scale data centers. TRILL is an IETF (Internet Engineering Task Force) protocol implemented by devices such as Routing Bridges. TRILL introduces new data and control planes for Ethernet networks. FabricPath protocol allows combining plug-and-play simplicity of Ethernet with the reliability and scalability of Layer 3 routing. FabricPath, allows for the build of highly scalable Layer 2 multipath networks without the Spanning Tree Protocol. Such networks are used, for example, with large virtualization deployments, private clouds, and high-performance computing (HPC) environments.

The main motivation behind using such technologies is their layer-2 like simplicity while they ensure efficient data forwarding by using shortest path routes for known unicast traffic. However, to carry unknown unicast traffic (such as frames destined to broadcast MAC address FF:FF . . . :FF or for which destination MAC and switch-id binding is not known) and multicast traffic tree-based forwarding mechanism is used.

Prior mechanisms simply choose the root for the multicast trees based on the priority of the nodes. This may lead to inefficient forwarding if root nodes are not chosen carefully. There is a need for a mechanism to choose the optimal roots for multicast trees used for carrying multicast/unknownlunicast/broadcast traffic while minimizing the overall delivery cost.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
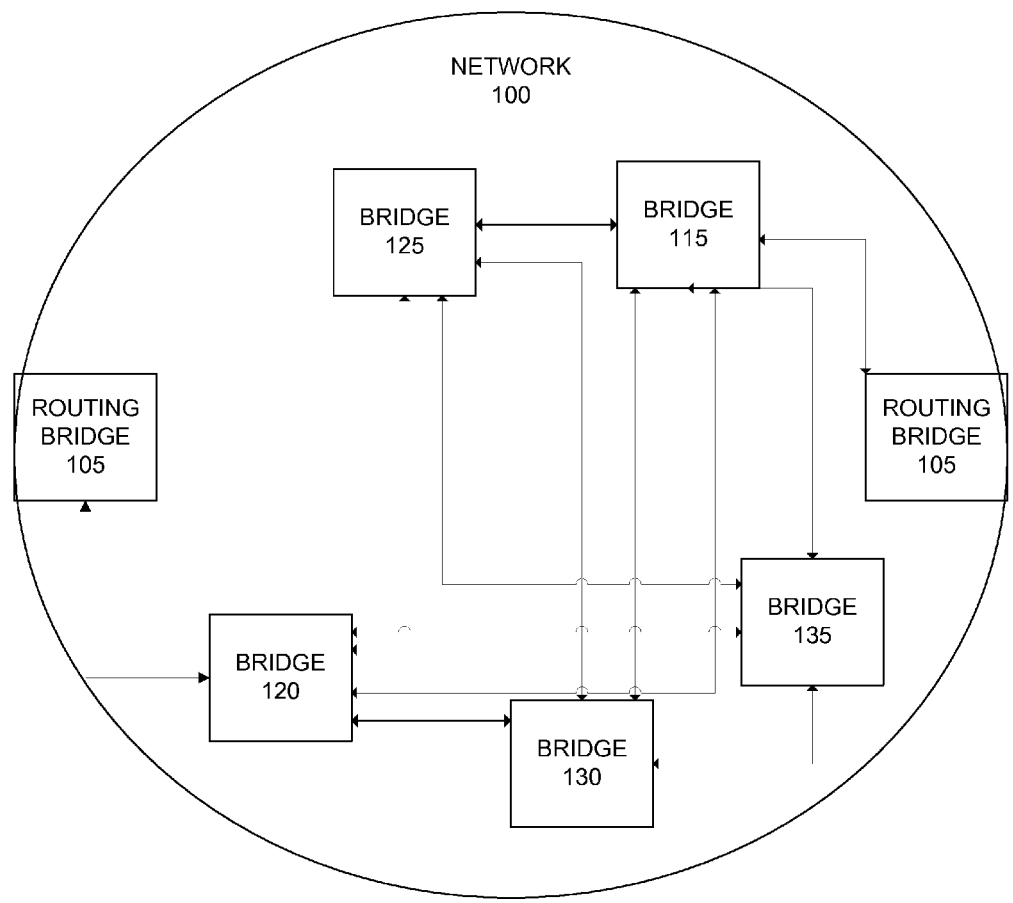
FIG. 1 illustrates an example network environment for embodiments of this disclosure.

Consistent with embodiments of the present disclosure, systems and methods are disclosed finding optimal multicast tree toots without the knowledge of the traffic sources and receivers.

In some embodiments, a method for optimized root node identification without prior knowledge of multicast traffic sources and receivers is described. A priority value may be computed for each of a plurality of nodes as equal to a maximum priority value less a normalized distance value calculated as: a distance of the largest shortest path from the node to any other of the plurality of nodes added to the average distance from the node to any other of the plurality of nodes. An optimal candidate node may then be selected to become the root for one or more multicast trees, wherein the optimal candidate node is a node determined to have the minimum expected distance based on the computed priority values.

In some embodiments, a method to select a root node candidate which minimizes the expected distance for multicast frame travel may be described. A plurality of unicast SPF runs may be performed to determine SPF costs. Each run may first comprise maintaining a first variable for the value of the largest SPF cost to be computed for any node so far. Next, a second variable may be maintained for the value of the total SPF cost for all nodes for which unicast SPF costs have been computed. A third variable may also be maintained for the number of nodes for which SPF cost has been computed. A root node candidate node may be selected based on the first variable, the second variable and the third variable.

In some embodiments, methods may determine an average SPF cost for each of a plurality of nodes. Expected distance values may be calculate for each of the plurality of nodes as (the average SPF path cost+a largest determined SPF cost for each node). The expected distance values may then be normalized. Optimized root priorities may be calculated for each of the plurality of nodes as equal to a default root priority value+a bracketing value*(1−the normalized expected distance value).

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and substituting, reordering, or adding stages to the disclosed methods may modify the methods described herein. Accordingly, the following detailed description does not limit the disclosure. Instead, the proper scope of the disclosure is defined by the appended claims.

The cost to deliver a multicast frame may be computed as the Shortest Path First (SPF) distance between the source node and the node farthest from the source along the multicast tree used for forwarding. SPF may be used as the basis for route calculation. It has a computational complexity of the square of the number of nodes, which can be decreased to the number of links in the domain times the log of the number of nodes for sparse networks (networks which are not highly connected).

Embodiments of the present disclosure describe a methodology to identify the nodes which minimize an expected distance value for multicast frames. Notably, such embodiments work without the prior knowledge of multicast traffic sources and receivers.

Referring to FIG. 1, an example of a network 100 in which embodiments described herein may be implemented is shown. The embodiments described herein may operate in the context of a data communication network including multiple network devices. Some of the devices in the network may be routing bridges, switches, bridges, routers, gateways, or other network devices. In some embodiments, the network device is implemented on a general purpose machine as described below with respect to FIG. 4.

In some embodiments, network 100 may be a TRILL network and one or more of the network devices are routing bridges. The network 100 shown in FIG. 1 includes routing bridge 105 and routing bridge 110 located at an edge of network 100. Network 100 may further include a plurality of internal routing bridges 115, 120, 125, 130, 135. Routing bridge 105 and routing bridge 100 (also referred to as "edge routers") may operate as ingress and egress nodes, respectively, for a flow entering network 100 at routing bridge 105 and leaving the network respectively at routing bridge 110, for example.

In a network, such as network 100, a tree with a network device as a root node, wherein the root network device has the smallest largest shortest path distance to any node in the network. Such a root network device may be used to provide the least cost (or distance) multicast tree for delivering traffic to all the other nodes (network devices). As the traffic sources are unknown, an assumption may be made that all the nodes have same probability of having traffic sources behind them with uniformly distributed traffic loads. Therefore, a node which has overall minimum average cost to all the other nodes, guarantees the minimum expected distance from the source node to the node.

For the purpose of illustrating embodiments of the present invention, the largest shortest path distance from a node x to any other node may be denoted as Isp_distance(x). Isp_distance(x) represents the maximum cost to deliver the multicast frame to all the receivers from the root node, which is same as the largest shortest path from node x to any other node in the network. Next, the cost to deliver the multicast frame from the source node to root node x is given by the shortest path distance between the root and the source node.

Since an assumption was made that sources could be behind any node in the network with the same probability, the expected cost to deliver the packet from the source node to the root node x of the tree may be represented by the average shortest path distance to any other node from node x. This value may be denoted as avg_distance(x). Finally, the expected distance in the forwarding of a multicast frame with the node x as the root of the multicast tree can be given by (expected_distance(x)): expected_distance(x)≈Expected distance between the root of the tree (node x) and all the other source nodes+Largest distance in delivering the multicast frame from the root to all the receivers.

$$\text{expected\_distance}(x) \approx \text{avg\_distance}(x) + Isp\_\text{distance}(x), \quad \text{(Eq. 1)}$$

$$\text{expected\_distance}(x) \geq Isp\_\text{distance}(x) \quad \text{(Eq. 2)}$$

In some embodiments, expected_distance for node x is defined as the expected Shortest Path First ("SPF") cost to deliver the packet from the source node to all the other nodes in the network, when node x is the root for the multicast tree used. Based on Eq. (1) and (2): the node y with minimum expected_distance(x) is given by:

$$y = \text{argmin} x\_\text{nodes}(\text{expected\_distance}(x)) -, \text{wherein "nodes" refers to the set of all nodes in the network.} \quad \text{(Eq. 3)}$$

Therefore, based on Eq. (3) the node y with minimum expected_distance(y) will minimize the overall SPF cost and hence y should be the optimal candidate to become the root for multicast trees.

Based on the above observations embodiments derive the formula for computing the root_priority for a node x as:

$$\text{root\_priority}(x) = \text{max\_priority} - \text{normalize}(Isp\_\text{distance}(x) + \text{avg\_distance}(x)) \text{ wherein, max\_priority} = 255 \text{ and normalize is a function which normalizes the value so that it is between 0 and 254.} \quad \text{(Eq. 4)}$$

The locally calculated root_priority by a node may be advertised to all the other nodes using the existing mechanism by using the largest shortest path. Based on Eq. (4) a node which has the minimum expected latency will have the highest priority value, and hence would be chosen as the root node. In case of a tie, it is broken using the existing methodology of comparing system ids and switch ids.

Embodiments of the present disclosure maintain a number of state variables during each unicast SPF run. These state variables may be reset before the beginning of each unicast SPF run. A first state variable may be indicated as the largest_spf_path_cost. largest_spf_path_cost may be initialized to 0, and may be used during operation to hold the value of the largest spf cost to any node for which path has been computed during operation.

A second state variable may be indicated as total_spf_path_cost. total_spf_path_cost may be initialized to 0, and may be used during operation to hold the total spf cost for all nodes for which unicast shortest paths have been computed. Similarly, a third state variable may be indicated as total_nodes. total_nodes may be initialized to 1 to include the identified local node. Each time a shortest path is computed for a node, total_nodes may be incremented by one.

After the unicast SPF run, embodiments of the present disclosure compute a root_priority value as follows. First, the avg_spf_path_cost may be set equal to total_spf_path_cost/total_nodes. The expected_distance values may be similarly calculated as (avg_spf_path_cost+largest_spf_path_cost) normalized_expected_distance=max(expected_distance/(MAX_DISTANCE*2), 1). In some embodiments of the present disclosure, MAX_DISTANCE may be set to 1000, however, it should be understood that MAX_DISTANCE may be determined based on the network diameter or other parameters.

The optimized_root_priority may then be equal to the default_root_priority+128*(1−normalized_expected_distance). In some embodiments of the present disclosure, default_root_priority may be set to 64 as the default value. Based on the above, optimized_root_priority may then be bounded by the interval [64, 192]. It should be understood that the interval boundary may be different depending upon differing predetermined parameters. For example, since a maximum possible configured value of root_priority could be up to 255, and a maximum value based on the optimized_root_priority may be 192, a window of values between [193, 255] may be provided for operators if they want to override the optimized root selection feature and configure a certain selected node as the root.

In some embodiments, if the optimized_root_priority is different from a currently advertised value of the root priority in the LSP of the node, then the following two things are done in some embodiments of the present disclosure. First, the LSP may be updated with the new value so that other nodes can re-run the root election with the updated priority. Secondly, root election may be run locally before each multicast tree computation.

Figure 2:
FIG. 2 illustrates an example network environment for embodiments of this disclosure.
Figure 2:
Figure 2:

FIG. 2 is a flow chart illustrating operation of embodiments of the present disclosure. Method 200 may start at step 210 where a priority value for each of a plurality of nodes is calculated as equal to a maximum priority value less a normalized distance value calculated as: a distance of the largest shortest path from the node to any other of the plurality of nodes added to the average distance from the node to any other of the plurality of nodes.

Subsequently, at step 220, an optimal candidate node may be selected as the root for one or more multicast trees, wherein the optimal candidate node is a node determined to have the minimum expected distance based on the computed priority values. In some embodiments, a predetermined maximum value may be established under which the priority value must fall.

In some embodiments, the expected distance for the optimal candidate node is the expected SPF cost to deliver a multicast packet from a source node to all the other nodes in the network, when the optimal candidate node is the root for the multicast tree used.

In some embodiments, the expected distance may comprise in part the largest distance in delivering the multicast frame from the root to all the network devices. To point, in some embodiments the expected distance may be greater than or equal to the largest shortest path distance.

In some embodiments, the expected cost to deliver the packet from the source node to a root candidate node is the average shortest path distance to any other node is from node x.

Method 200 may then proceed to step 230 where it may be determined whether two or more nodes are determined to have the same priority value. In some embodiments, if two or more nodes are determined to have the same priority value differing priority values may be assigned based on a comparison of network device identifiers. Method 200 may proceed to step 240. At step 240, the priority value for the optimal candidate node may be advertised to all the other nodes.

Figure 3:
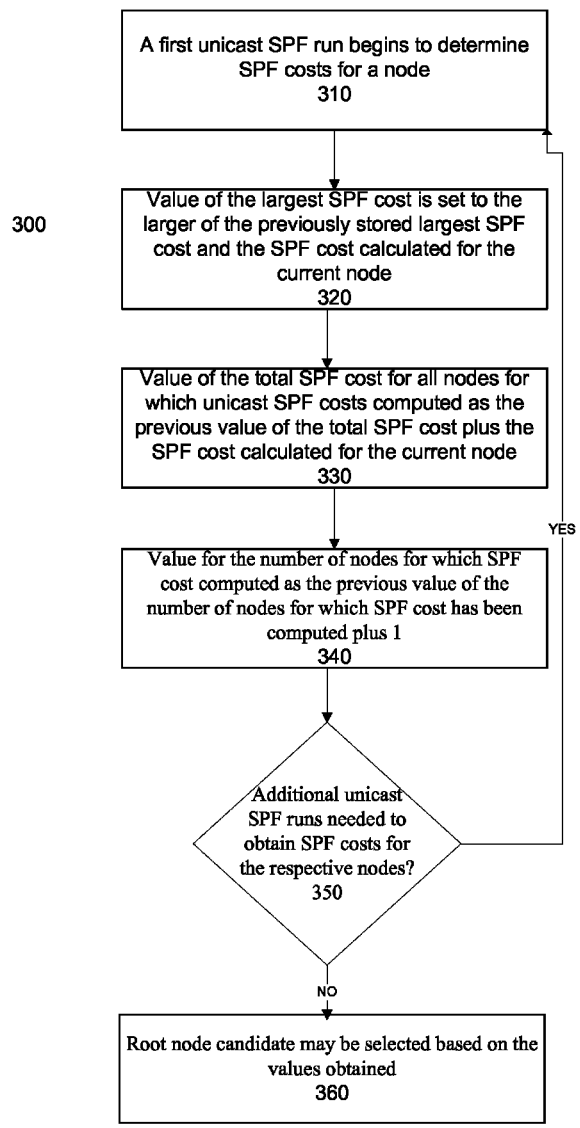
FIG. 3 is a flow chart illustrating embodiments of this disclosure.

FIG. 3 is a flow chart illustrating operating of embodiments of the present disclosure. Method 300 may begin at step 310 where a first unicast SPF run begins to determine SPF costs for a node. Method 300 proceeds first to step 320. At step 320 a value of the largest SPF cost is set to the larger of the previously stored largest SPF cost and the SPF cost calculated for the current node.

Next, method 300 may proceed to step 330 where a value of the total SPF cost for all nodes for which unicast SPF costs may be computed as the previous value of the total SPF cost plus the SPF cost calculated for the current node.

Method 300 may then proceed to step 340. At step 340 a value for the number of nodes for which SPF cost may be computed as the previous value of the number of nodes for which SPF cost has been computed plus 1.

At step 350, method 300 determines whether or not additional unicast SPF runs are needed to obtain SPF costs for the respective nodes. If additional unicast SPF runs are desired, method 300 returns to step 310. Alternatively, if no additional unicast SPF runs are desired, method 300 proceeds to step 360 where a root node candidate may be selected based on the values obtained in method 300. In some embodiments, the root node candidate is selected by determining node priority values based on the values in method 300.

In some embodiments, prior to the initial execution of method 300, the value of the largest SPF cost may be initialized to zero. Similarly, the total SPF cost for all nodes for which unicast SPF costs may be computed may be initialized to zero.

Employment of embodiments of the present disclosure has several advantages over previous approaches. Notably, present embodiments are optimal to prior root selection methodology in the absence of identifying source and receivers of the multicast traffic. Such efficient root election helps in the efficient use of network resources which significantly improves the multicast traffic delivery for cloud-based implementations.

Furthermore, presently described embodiments provide a framework which is completely distributed in nature. Each node can compute their priority independently, and then use the existing LSP-based information carrying methodology to find the best root in the network. Presently described embodiments are intuitive to implement without any disruptions to existing mechanisms. Further it creates only minimal computation overhead, as the shortest paths to other nodes are available as a part of the unicast SPF run.

Figure 4:
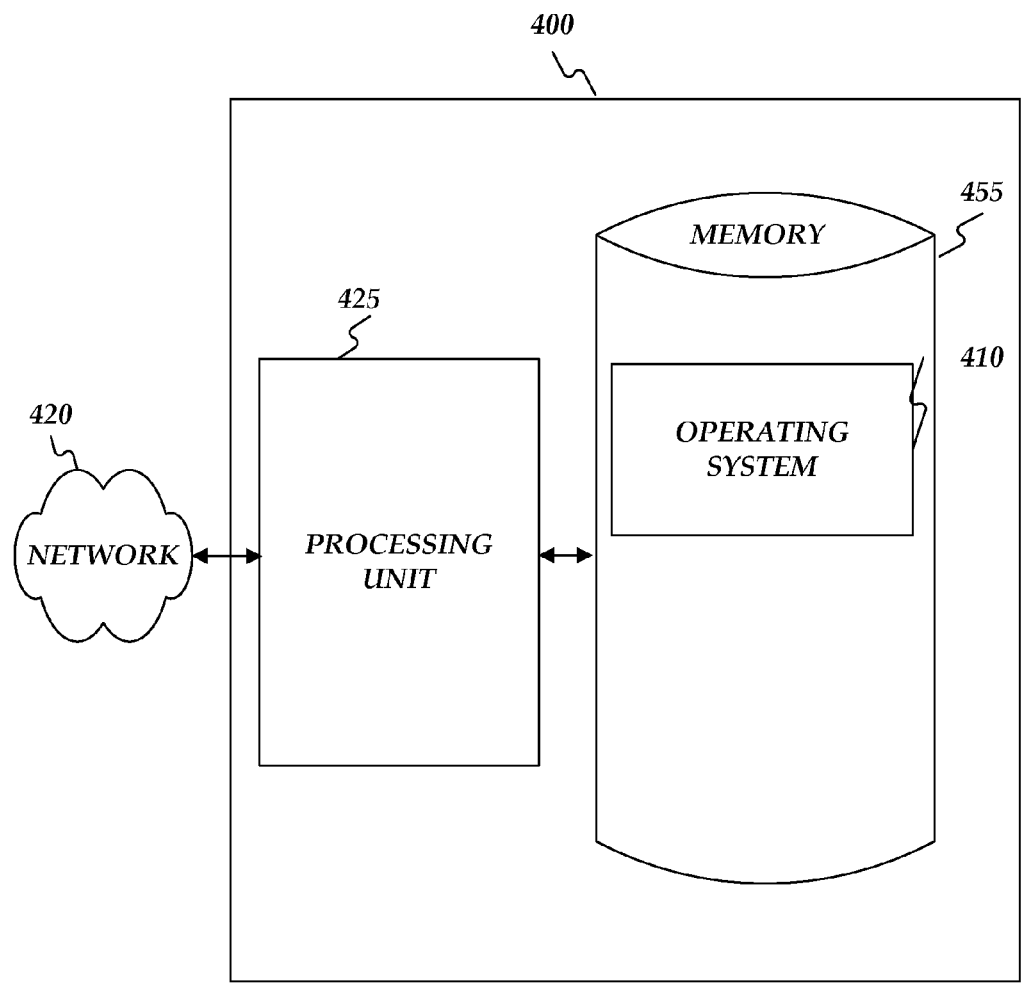
FIG. 4 is a block diagram of a computing network device.

FIG. 4 illustrates a computing device 400, such as a server, host, or other network devices described in the present specification. Computing device 400 may include processing unit 425 and memory 455. Memory 455 may include software configured to execute application modules such as an operating system 410. Computing device 400 may execute, for example, one or more stages included in the methods as described above. Moreover, any one or more of the stages included in the above describe methods may be performed on any element shown in FIG. 4.

Computing device 400 may be implemented using a personal computer, a network computer, a mainframe, a computing appliance, or other similar microcomputer-based workstation. The processor may comprise any computer operating environment, such as hand-held devices, multi-processor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method for optimized root node identification, the method comprising:
    determining a priority value for each of a plurality of nodes of a Fabricated and Transparent Interconnection of Lots of Links (TRILL) network as equal to a maximum priority value less a normalized distance value, wherein determining the priority value further comprises determining the normalized distance value as a distance of the greatest shortest path from the node to any other of the plurality of nodes added to an average distance from the node to any other of the plurality of nodes; and
    selecting an optimal candidate node to become the root for one or more multicast trees, wherein the optimal candidate node is a node determined to have a minimum expected distance based on the computed priority values, wherein the minimum expected distance is an expected Shortest Path First ("SPF") cost to deliver a multicast packet from a source node to each of the other nodes in the network.

2. The method of claim 1, further comprising selecting the optimal candidate node as the root for the multicast tree used.

3. The method of claim 1, wherein the minimum expected distance comprises a largest distance in delivering the multicast frame from the root to all the receivers.

4. The method of claim 3, wherein the minimum expected distance is greater than or equal to the greatest shortest path distance.

5. The method of claim 1, wherein the expected cost to deliver the packet from the source node to a root candidate node is the average shortest path distance to any other node is from the source node.

6. The method of claim 1, further comprising establishing a maximum value under which the priority value must fall.

7. The method of claim 1, further comprising advertising the priority value for the optimal candidate node to all the other nodes.

8. The method of claim 1, wherein upon two or more nodes being determined to have the same priority value, assigning differing priority values based on a comparison of switch device identifiers.

9. A system comprising:
    a Fabricated and Transparent Interconnection of Lots of Links (TRILL) network comprising a plurality of routing bridges, wherein at least one of the plurality of routing bridges is configured to:
    determine a priority value for each of a plurality of nodes of a Fabricated and Transparent Interconnection of Lots of Links (TRILL) network as equal to a maximum priority value less a normalized distance value, wherein determining the priority value further comprises determining the normalized distance value as a distance of the greatest shortest path from the node to any other of the plurality of nodes added to an average distance from the node to any other of the plurality of nodes; and
    select an optimal candidate node to become the root for one or more multicast trees, wherein the optimal candidate node is a node determined to have a minimum expected distance based on the computed priority values, wherein the minimum expected distance is an expected Shortest Path First ("SPF") cost to deliver a multicast packet from a source node to each of the other nodes in the network.

10. The system of claim 9, wherein the minimum expected distance comprises a largest distance in delivering the multicast frame from the root to all the receivers.

11. The system of claim 9, wherein the minimum expected distance is greater than or equal to the greatest shortest path distance.

12. The system of claim 9, wherein an expected cost to deliver the packet from the source node to a root candidate node is the average shortest path distance to any other node is from the source node.

13. The system of claim 9, wherein upon two or more nodes being determined to have the same priority value, the at least one of the plurality of routing bridges being further configured to assign differing priority values based on a comparison of switch device identifiers.

14. A network device comprising: a memory; and a processor configured with logic to:
    determine a priority value for each of a plurality of nodes of a Fabricated and Transparent Interconnection of Lots of Links (TRILL) network as equal to a maximum priority value less a normalized distance value, wherein the processor being configured to determine the priority value comprises the processor being configured to determine the normalized distance value as a distance of the greatest shortest path from a node to any other of the plurality of nodes added to an average distance from the node to any other of the plurality of nodes; and
    select an optimal candidate node to become the root for one or more multicast trees, wherein the optimal candidate node is a node determined to have a minimum expected distance based on the computed priority values, wherein the minimum expected distance is an expected Shortest Path First ("SPF") cost to deliver a multicast packet from a source node to each of the other nodes in the network.

15. The network device of claim 14, wherein the processor is further configured with logic to select the node with the highest optimized priority to be a new root node.

16. The network device of claim 4, wherein upon two or more nodes being determined to have the same priority value, the processor being further configured to assign differing priority values based on a comparison of switch device identifiers.

17. The network device of claim 9, wherein the minimum expected distance comprises a largest distance in delivering the multicast frame from the root to all the receivers.

18. The network device of claim 9, wherein the minimum expected distance is greater than or equal to the greatest shortest path distance.

* * * * *